United States Patent [19]
Bui et al.

[11] Patent Number: 5,826,262
[45] Date of Patent: Oct. 20, 1998

[54] PARALLEL BOTTOM-UP CONSTRUCTION OF RADIX TREES

[75] Inventors: Thuan Quang Bui, Fremont, Calif.; Scott Dennis Helt, Rochester, Minn.; Balakrishna Raghavendra Iyer, San Jose, Calif.; Gary Ross Ricard, Chatfield, Minn.

[73] Assignee: International Business Machines Corporation, Armonk, N.Y.

[21] Appl. No.: 621,757

[22] Filed: Mar. 22, 1996

[51] Int. Cl.$^6$ ........................................................ G06F 17/30
[52] U.S. Cl. ........................ 707/7; 707/2; 711/1; 370/408
[58] Field of Search .................... 395/607, 602, 395/182.13; 707/7, 2; 711/1; 370/408

[56] References Cited

U.S. PATENT DOCUMENTS

| | | | |
|---|---|---|---|
| 3,916,387 | 10/1975 | Woodrum | 340/172.5 |
| 4,774,657 | 9/1988 | Anderson et al. | 395/602 |
| 4,819,156 | 4/1989 | DeLorme et al. | 395/182.13 |
| 5,058,002 | 10/1991 | Nakamura et al. | 364/200 |
| 5,179,699 | 1/1993 | Iyer et al. | 395/607 |
| 5,202,986 | 4/1993 | Nickel | 395/600 |
| 5,241,648 | 8/1993 | Cheng et al. | 707/7 |
| 5,345,585 | 9/1994 | Iyer et al. | 707/2 |
| 5,355,473 | 10/1994 | Au | 395/600 |
| 5,446,887 | 8/1995 | Berkowitz | 395/600 |
| 5,490,258 | 2/1996 | Fenner | 711/1 |
| 5,546,390 | 8/1996 | Stone | 370/408 |
| 5,659,728 | 8/1997 | Bhargava et al. | 707/2 |

OTHER PUBLICATIONS

Varman et al. "An Efficient Multiprocessor Merge Algorithm", PARABASE '90, p. 276283, 1990.

Wolf et al. "Optimal Buffer Partitioning for the Nested Block Join Algorithm", Digital Engineering, 1991 7th Int'l Conf., pp. 510–519, 1991.

Cheng et al. "An Efficient Hybrid Join Algorithm: A DB2 Prototype", Data Engineering, 1991 7th Int'l Conf., pp. 171–180, 1991.

Ciciani et al. "A Hybrid distribution Centralized System Structure for Transaction Processing", IEEE Transactions on Software Eng., vol. 16, No. 8, pp. 791–806, 1990.

Howard et al. "System/38 Machine Data Indexing Support", IBM System/38 Technical Developments, pp. 67–79, 1978.

Law et al. "Multicast and Self–Routing in ATM Radix Trees and Banyan Networks", Infocom '95, vol. 3, pp. 951–959, 1995.

IBM Technical Disclosure Bulletin, Vol. 19, No. 4, p. 1360, Sep. 1976, "Search Argument Checking", C. H. Wolff and L. J. Woodrum, P0875–0359.

IBM System/38 Technical Developments, 1978, "System/38 Machine Data Base Support", C. T. Watson and G. F. Aberle, pp. 59–62, System/38 Machine Indexing Support, P. H. Howard and K. W. Borgendale, pp. 67–69, and System/38 Data Base Concepts, C. T. Watson, F. E. Benson and P. T. Taylor, pp. 78–80.

Chandrasekharan et al, "Ray Tracing and Binary Trees Computations Using PVM"; Proceeding of the Twenty–Sixth Hawaii International Conference on System Sciences; Jan. 1993; pp. 104–105.

Primary Examiner—Thomas G. Black
Assistant Examiner—Charles L. Rones
Attorney, Agent, or Firm—Owen J. Gamon

[57] ABSTRACT

A method for partitioning keys onto radix tree logical pages and a parallel index page build algorithm in order to provide radix tree build speedup proportional to the number of processors on the system and controlled efficient page utilization. Also, since keys are intelligently partitioned so that a complete set of keys is inserted into a logical page, there is no page overflow during the tree construction and thus page splitting is eliminated. Since radix index trees are really groups of logical pages in which each logical page contains a small tree, the tree is built (with respect to the logical pages) from the bottom up, while within each individual logical page the tree is constructed from the top down. The space required for a logical page is pre-allocated to allow construction of limbs to begin without waiting for the build of their underlying pages to complete.

9 Claims, 11 Drawing Sheets

TOD Calculation

| | byte #1 | byte #2 | byte #3 | byte #4 |
|---|---|---|---|---|
| char: | B | A | A | |
| binary encoding: | 1 1 0 0 0 0 1 0 | 1 1 0 0 0 0 0 1 | 1 1 0 0 0 0 0 1 | |
| bit #: | 0 1 2 3 4 5 6 7 | 0 1 2 3 4 5 6 7 | 0 1 2 3 4 5 6 7 | | bit-of difference →

| | | | | K |
|---|---|---|---|---|
| char: | B | A | R | |
| binary encoding: | 1 1 0 0 0 0 1 0 | 1 1 0 0 0 0 0 1 | 1 1 0 1 0 0 0 1 | 1 1 0 1 0 0 1 0 |
| bit #: | 0 1 2 3 4 5 6 7 | 0 1 2 3 4 5 6 7 | 0 1 2 3 4 5 6 7 | 0 1 2 3 4 5 6 7 |

TOD = 8*number_of_leading_bytes_in_common + bit_of_difference_value
    = 8*2 + 3 = 19

Bytes one and two containing the characters 'B' and 'A' are common leading text in the above two keys. Thus there are 2 bytes in common.

The above two keys differ in the third bit of the third byte.

FIG. 2

PARALLEL BOTTOM-UP CONSTRUCTION OF RADIX TREES

FIELD OF THE INVENTION

This invention relates to the data structure of radix trees. More particularly, this invention relates to the parallel construction from the bottom up of a radix tree.

BACKGROUND

A database is an amalgamation of data that has an organized structure in the memory of a computer system. Data in a database can be organized via a tree (also called an index), which is a data structure that defines the organization of data in memory in such a way so as to allow for fast searching of the data and dynamic sorting (also called collating) of the data. A database can be comprised of data spaces that contain records and indexes that define how the records can be accessed by the computer system. A record contains keys, which are the contents of the record that identify the record and which are capable of being searched for and sorted on. An index provides a logical ordered list of its associated records based on key values in the records. An index can be used by the computer system to provide a sorted order for the tree to facilitate fast searching of the tree for a record that has a particular key.

The tree data structure takes its name from the trees of nature because they both have a branching relationship between nodes. A tree data structure is divided (also called partitioned) into logical memory pages, which are blocks of data paged as a unit between primary and secondary storage in a computer system. In partitioning a tree, the goal is to minimize the amount of data that must be paged to locate a particular key, thus increasing system performance. The trunk page is the first, or topmost, logical page of a tree. The leaf pages are the bottom-most logical pages in the tree. The limb pages are logical pages between the leaf pages and the trunk page. Thus, the tree data structure grows downward from the top, the opposite of trees in nature.

A radix tree is a type of tree that uses bit tests to determine the path to a key. Instead of comparing the whole search key with the various index entries, in a binary radix tree a single bit of the search key is tested on each step through the tree and, thereby, it is determined which of two paths will be followed on the next step. Similarly, in a quad-radix tree, two bits of the search key is tested on each step through the tree and, thereby, it is determined which of four paths would be followed on the next step. By extension, radix trees with a multiplicity of paths can be supported.

Certain bits of the search key are not tested in a radix tree because all of the candidates (those index entries which have satisfied all the prior tests) have those bits in the same state. Radix trees have front end compression in that leading text common among two or more successive keys is stored only once in the tree, usually on a non-leaf tree page. Radix trees are powerful data structures because they allow similar searching performance as do B-trees but with significantly less space utilization. However, an efficient radix tree build mechanism that can take advantage of parallel processing does not exist.

Computers with multiple, parallel processors capable of operating independently in order to provide a performance advantage are becoming prevalent. In a parallel processing computer system, work is broken up into independent pieces, which are executed concurrently (that is, in parallel) by multiple processors. Thus, just as 10 ditch diggers working concurrently can theoretically dig a ditch 10 times faster than a single ditch digger, 10 processors working in parallel can theoretically perform a piece of work 10 times faster than a single processor. However, in order to realize this theoretical maximum performance speed up, the work being divided into pieces must be independent and not have sequential requirements, that is each piece must be capable of being executed without regard to and without waiting for the outcome of all other pieces.

In the prior art, a radix tree is constructed from the top down by sequentially traversing the keys and inserting them into the tree, so as to provide a sorted order by key for the records in the tree. This sequential, serial build process does not lend itself to being broken up in parallel operations for execution on multiple, parallel processors. Thus, the prior art index construction is not capable of taking advantage of the potential benefits of parallel processing and does not allow for a performance speed up proportional to the number of processors in the computer system.

In the prior art, partitioning of the tree into logical pages is done on a dynamic basis as the tree grows. Consequently, during the process of tree construction as keys, are inserted into the tree, an insertion of a key onto a full logical page would cause the logical page on which it is inserted to overflow and split into two pages. This splitting of a page can increase the index tree depth unless the residue from the split (i.e., the data on the new parent of the split-off child pages) is merged into its parent page. (The index tree depth is the number of pages that a search algorithm must visit in order to find a key of interest. A search algorithm of a tree with a large index depth will thus experience many page faults and resulting poor performance). This merge may, in turn, cause overflow on the parent page and it may be required to split that page and merge the residue into its parent page, the grandparent page of the original split page. This extra paging activity could potentially undulate up to the trunk page and is a significant performance degradation in the prior art top-down radix tree build method because pages must be repeatedly revisited and processed.

In an attempt to solve this problem, some prior art solutions have attempted to achieve less paging at build time by reducing the number of logical page splits by using lower page utilizations, e.g. 50% of the page initially has data to allow for future expansion. This solution suffers from the problem of increased index depth and increased paging at runtime with a corresponding degradation in runtime performance. There is increased paging at runtime because there are more pages since each page has less data.

The ability to build a radix tree from the bottom up instead of from the top down would solve the above undulation problem because page splits become unnecessary since the keys for each index page are known before construction of the page begins. Knowing the keys assigned to each logical page in advance would also result in decreased index depth and better page utilization, ultimately resulting in improved performance.

Bottom-up build methods require knowledge of exactly which keys will be deposited on a given index partition (logical page). Since the contents of each index partition must be known prior to actually building the partition, page splits are eliminated, page utilization can be rigidly controlled, and if multiple partitions are constructed simultaneously, a speed up proportional to the number of processors can be achieved.

However, radix trees have two characteristics that complicate the task of determining exactly what data belongs in each index partition. These characteristics must be accounted for in order to build a radix tree from the bottom-up.

First, radix trees have front end compression in that leading text common among two or more successive keys is stored only once in the tree, usually on a non-leaf tree page. Common text must be taken into consideration when grouping key data since it directly affects page utilization. Common text must be positioned prior to any keys in the tree for which it is common. Thus, common text must be stripped from current keys and counted as space utilization for prior pages.

Second, the node structure of a radix tree is fixed depending on the key data in the tree. All keys in a radix tree partition must be in the same node-structure subtree (i.e., all subtrees on a page must have a common parent on that page) and thus cannot be arbitrarily grouped to satisfy page utilization or reference concerns.

Both of these characteristics must be accommodated in order to produce a functionally correct radix tree, but the prior art has not been able to accommodate these characteristics without actually building the tree top-down and analyzing the resultant tree structure.

For the foregoing reasons, there is a need for a method that detects which keys can functionally be placed together on radix tree index pages, to facilitate bottom up parallel construction of the tree, which would be a significantly better performer than building the tree from the top down.

SUMMARY OF THE INVENTION

It is an object of the present invention to provide an enhanced index build mechanism.

It is a further object to provide for parallel construction from the bottom up of an index, which would provide a performance gain proportional to the number of processors used in parallel.

It is a further object to provide parallel construction from the bottom up of a radix tree.

It is a further object to provide an enhanced index build mechanism of a radix tree that eliminates page splitting and gives controlled efficient page utilization.

These and other objects are achieved by a fast method for partitioning keys onto radix tree logical pages and a parallel index page build algorithm in order to provide radix tree build speedup proportional to the number of processors on the system and controlled efficient page utilization. Also, since keys are intelligently partitioned so that a complete set of keys is inserted into a logical page, there is no page overflow during the tree construction and thus page splitting is eliminated. Since, in the preferred embodiment, radix index trees are really groups of logical pages in which each logical page contains a small tree, the tree is built (with respect to the logical pages) from the bottom up, while within each individual logical page the tree is constructed from the top down. The space required for a logical page is pre-allocated to allow construction of limbs to begin without waiting for the build of their underlying pages to complete.

To build a radix tree from the bottom up in parallel, the list of sorted keys contained in the tree is divided into groups of keys that are eligible to be deposited on a logical page and multiple logical pages are constructed simultaneously. The three factors that determine which keys can be deposited on a logical page are: the common text shared by two consecutive keys in the index, the bit-of-difference value between consecutive keys in the index, and the logical page size used in the tree.

Logical pages of the tree are built in parallel given that the key text to be placed on those pages does not contain any common text that should be placed on prior levels of the tree (e.g., higher level common text must be stripped from the keys before insertion).

The bit-of-difference value is the bit position (starting from 0) in which two hexadecimal representations of two characters in two successive sorted keys in the index are different.

Logical pages of an index tree are packed as close to the desired page utilization range as possible.

BRIEF DESCRIPTION OF THE DRAWINGS

FIG. 2 is a data calculation diagram that shows how the text of difference score is computed, according to the preferred embodiment.

DETAILED DESCRIPTION OF THE PREFERRED EMBODIMENT

The preferred embodiment provides a fast method for partitioning keys onto radix tree logical pages and a parallel index page build mechanism in order to provide radix tree build speedup proportional to the number of processors on a computer system and controlled efficient page utilization. Also, since keys are intelligently partitioned so that a complete set of keys is inserted into a logical page, there is no page overflow during the tree construction and thus page splitting is eliminated. A complete set of keys occurs when all subtrees on the same page have a common parent on that page. Since, in the preferred embodiment, radix index trees are really groups of logical pages in which each logical page contains a small tree, the tree is built (with respect to the logical pages) from the bottom up, while within each individual logical page the tree is constructed from the top down.

The preferred embodiment does not wait for all pages at the same level to complete before requesting the build of parent limbs; instead, as soon as all pages under a limb are requested, page construction can begin for that parent limb. Although the requests to construct the pages are generated one level at a time, the processing that constructs the page can run simultaneously so that the actual page construction is not limited to one level.

To build a radix tree from the bottom up in parallel, the list of sorted keys contained in the tree is divided into groups of keys that are eligible to be deposited on a logical page and multiple logical pages are constructed simultaneously. The three factors that determine which keys can be deposited on a logical page are: the common text shared by two consecutive keys in the index, the bit-of-difference value between consecutive keys in the index, and the logical page size used in the tree.

Logical pages of the tree are built in parallel given that the key text to be placed on those pages does not contain any common text that should be placed on prior levels of the tree (e.g., higher level common text must be stripped from the keys before insertion).

The bit-of-difference value is the bit position (starting from 0) in which two hexadecimal representations of two characters in two successive sorted keys in the index are different.

Logical pages of an index tree are packed as close to the desired page utilization range as possible.

Figure 1:
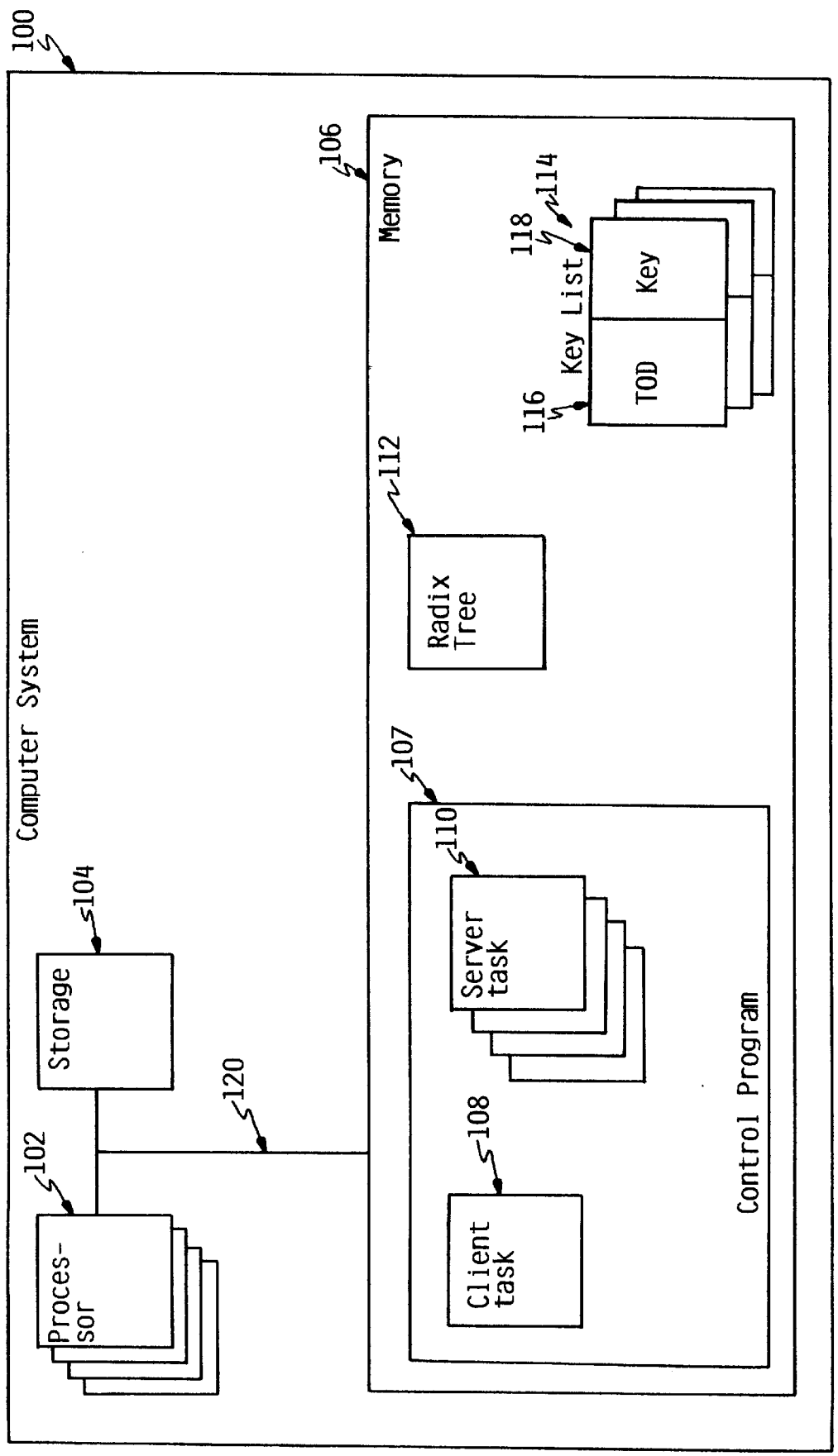
FIG. 1 shows a block diagram of a computer system, according to the preferred embodiment.

FIG. 1 shows a block diagram of computer system 100, according to a preferred embodiment. Computer system 100 contains multiple processors 102 connected via bus 120 to storage 104 and memory 106.

Memory 106 is a random access memory sufficiently large to hold the necessary programming and data structures. While memory 106 is shown as a single entity, it should be understood that memory 106 may in fact comprise a plurality of modules, and that memory may exist at multiple levels, from high-speed registers and caches to lower speed but larger DRAM chips. Memory 106 contains control program 107, key list 114, and radix tree 112. Control program 107 is further divided into client task 108 and multiple server tasks 110, which both contain instructions that, when executed on processors 102, carry out the preferred embodiment as further described under the description for FIGS. 5 and 6. The contents of memory 106 can be loaded from and stored to storage 104 as processors 102 have a need for it.

In the preferred embodiment, storage 104 is DASD (Direct Access Storage Device), although it could also be other storage such as floppy disk drives, tape drives, removable memory cards, or optical storage. While storage 104 is depicted as a single entity, it should be understood that storage 104 may in fact comprise a plurality of storage devices.

In the preferred embodiment, computer system 100 is an IBM AS/400™. Computer system 100 could also be another type of computer system, whether it be another microcomputer such as a PS/2™ or an Apple Macintosh™, or a mainframe computer such as an IBM System/390™, and still fall within the spirit and scope of this invention. In addition, computer system 100 could be a microcomputer such as described above but connected to a larger computer system such as an IBM AS/400™. It will be readily appreciated that the principles of the invention may apply to other computer applications, such as other mainframes, minicomputers, network servers, supercomputers, personal computers, or workstations. Therefore, while the discussion herein focuses on a particular IBM AS/400™ application, the invention should not be limited to the particular hardware or software designs, performance parameters, or application-specific functions disclosed herein.

Client task 108 creates key list 114, which contains all keys 118 in tree 112 sorted in ascending order. Client task 108 then partitions groups of keys from key list 114 to place at the leaf level of tree 112. The criteria for selecting partitions (groups) of keys is described below under the description for FIGS. 5 and 6. If there is leading text common to all keys in the group and any adjacent group or key, the client task strips the common text from each key in the group since the common text is stored in the tree at a position common to both groups. For each group (partition) of keys formed, client task 108 then allocates a page (storage) and sends a leaf page construction request to a server task's queue, and adds an entry replacing the selected keys to key list 114. The updated key list 114, containing both new entries representing the groups selected and keys not selected, forms a new list which will be used later for building the prior (parent) logical limb level. Keys not selected for a group remain in key list 114 in the same order as they are on key list 114 being processed so that sorted ascending order of the keys in key list 114 is maintained.

When client task 108 reaches the end of key list 118, all page construction requests for that level have been sent to server task 110 and key list 118 has been updated to reflect the groups at the leaf level. The client task continues partitioning keys for each level of tree 112 until the trunk page is reached. The operation of client task 108 in the preferred embodiment is more fully described in the flowchart of FIG. 6.

Multiple server tasks 110, capable of executing in parallel on multiple processors 102, process logical page construction requests, received from client task 108 concurrently and separately. Upon receiving a request, server task 110 builds an index subtree top-down for the given set of keys, as is further described below under the description for FIG. 6. Then, server task 110 sends a response to the client's response queue. Top-down subtree construction is the act of performing standard key insertion for each key in the given key set. The operation of server task 110 in the preferred embodiment is more fully described in the flowcharts of FIGS. 5 and 6.

Client task 108 partitions the keys (i.e. divides the list of sorted keys into groups of keys, as described above) at each tree level based on three criteria: leading common text, bit-of-difference value between adjacent keys, and the key text size. The first two criteria provide valid split points but the last one ultimately determines if a key can be put into a logical page. Client task 108 accomplishes both the leading common text criteria and the bit-of-difference criteria by assigning a value of "8" to each leading text key byte in common between two keys. Client task 108 adds this value to the bit-of-difference value (0 through 7) to give a final text-of-difference (TOD 116) score between 2 consecutive keys, as shown by the following formula:

$$text\_of\_difference\_score = (8*number\_of\_leading\_bytes\_in\_common) + bit\_of\_difference\_value.$$

Given an ascending list of keys, the client task uses the following four rules to partition the keys:

1. Only consecutive keys are grouped together.
2. Adjacent keys are grouped in the order of text-of-difference score. In other words, an entity (a key or a group) must be grouped with an adjacent key with a higher TOD score before it can be grouped with another adjacent key with a lower TOD.
3. Entries with common text can be split across pages provided that leading common text is properly removed and used for the prior limb level.
4. All proper key groupings are subtrees in the radix tree node structure.

Based on the above rules, the client task groups a list of keys by assigning a TOD value to each key entry. (TOD value is defined as the value between that entry and its preceding entry.) Then the client task scans the list from start to end looking for split points. A decline in TOD value indicates this is a proper split point where two preceding entities can be grouped to form a new entity (partition) with a resulting TOD being the lowest TOD value of the entities in the group. An exception to this split point is where the TOD declines from first entry to the second entry. In this case, since there is no entry prior to the first entry, no grouping is done.

The grouping process is continued until a fall page is detected or all keys are processed. At this point, all pending groups are sent off for logical page construction. For the full page condition, the list is virtually truncated at that point and the process is continued forward at the next entry.

FIG. 2 shows an example of how TOD is calculated for two adjacent keys, "BAA" and "BARK". Bytes one and two containing the characters "B" and "A" are common leading text in these two keys. Thus they have two bytes in common. These two keys first differ in the third bit of the third byte. Thus, TOD is 8*2+3=19.

Figure 3:
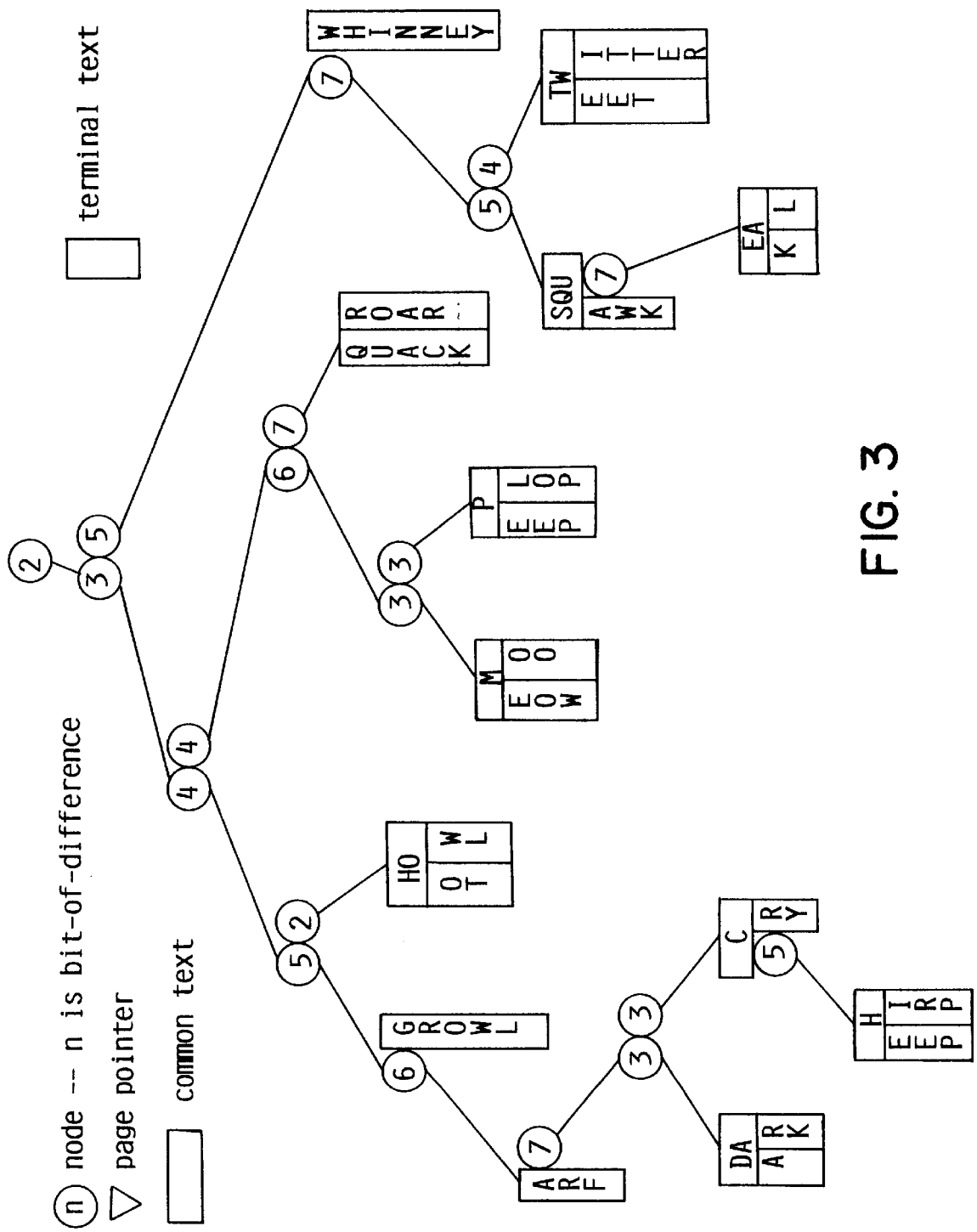
FIG. 3 shows an example of a binary radix tree data structure, according to the preferred embodiment.

To illustrate how key list 114 could be partitioned for parallel logical page construction, consider the example of the binary radix tree structure depicted in FIG. 3. For the sake of simple illustration, real key text is used instead of pointer to a key structure. The keys 118 used for the construction of the tree structure of FIG. 3 are as shown in Table 1.

TABLE 1

ARF
BAA
BARK
CHEEP
CHIRP
CRY
GROWL
HOOT
HOWL
MEOW
MOO
PEEP
PLOP
QUACK
ROAR
SQUAWK
SQUEAK
SQUEAL
TWEET
TWITTER
WHINNEY

To build the binary radix tree for keys 118 as shown in table 1, TOD values 116 are computed for each key list entry. Since the TOD value is defined as the value between that entry and its preceding entry, TOD value 0 is specially assigned to the first entry ARF. The other TOD values are calculated, and the contents of key list 114 becomes as shown in table 2.

TABLE 2

| TOD | Key |
| --- | --- |
| 0 | ARF |
| 6 | BAA |
| 19 | BARK |
| 7 | CHEEP |
| 20 | CHIRP |
| 11 | CRY |
| 5 | GROWL |
| 4 | HOOT |
| 18 | HOWL |
| 3 | MEOW |
| 11 | MOO |
| 6 | PEEP |
| 11 | PLOP |
| 4 | QUACK |
| 7 | ROAR |
| 2 | SQUAWK |
| 29 | SQUEAK |
| 47 | SQUEAL |
| 7 | TWEET |

TABLE 2-continued

| TOD | Key |
| --- | --- |
| 21 | TWITTER |
| 5 | WHINNEY |

Client task 108 starts leaf page level processing by scanning key list 114 from the beginning and looking for the first TOD drop. The TOD decline from 19 to 7 between BARK and CHEEP indicates that BAA and BARK can be grouped to form a starting partition with a resulting TOD of 6.

The contents of key list 114 now becomes as show in table 3.

TABLE 3

| TOD | Key |
| --- | --- |
| 0 | ARF |
| 6 | (BAA BARK) |
| 7 | CHEEP |
| 20 | CHIRP |
| 11 | CRY |
| 5 | GROWL |

Then, the TOD decline from 20 to 11 between CHIRP and CRY indicates that CHEEP and CHIRP can be grouped with a resulting TOD of 7.

The contents of key list 114 now becomes as shown in table 4.

TABLE 4

| TOD | Key |
| --- | --- |
| 0 | ARF |
| 6 | (BAA BARK) |
| 7 | (CHEEP CHIRP) |
| 11 | CRY |
| 5 | GROWL |
| 4 | HOOT |
| 18 | HOWL |
| 3 | MEOW |

Next, the TOD decline from 11 to 5 between CRY and GROWL indicates the group (CHEEP CHIRP) and CRY could be grouped. However, in this example a logical leaf page can fit only 2 keys, so that CRY cannot be acquired into (CHEEP CHIRP).

At this point, groups (BAA, BARK) and (CHEEP, CHIRP) have been formed and will be placed on the server queue for logical page construction.

Since C is the leading common text between group (CHEEP, CHIRP) and CRY, C is excluded in that data group to be sent off for logical page construction. The data would be (HEEP, HIRP).

Since full page is detected at CRY, the process is continued forward at the next entry, GROWL. The contents of key list 114 now becomes as shown in table 5.

TABLE 5

| TOD | Key |
| --- | --- |
| 5 | GROWL |
| 4 | HOOT |
| 18 | HOWL |
| 3 | MEOW |

Although there is a TOD decline from 5 to 4 between GROWL and HOOT, no grouping can be done because GROWL has no leading entity. Instead, client task 108 moves to the next TOD decline between HOWL(18) and MEOW(3), which indicates HOOT and HOWL can be grouped with a resulting TOD of 4. The contents of key list 114 now becomes as shown in table 6.

TABLE 6

| TOD | Key |
|---|---|
| 5 | GROWL |
| 4 | (HOOT HOWL) |
| 3 | MEOW |

The TOD decline from 4 to 3 between (HOOT HOWL) and MEOW indicates GROWL could be grouped with (HOOT HOWL). However, in this example due to the page being full, GROWL can't be acquired into (HOOT HOWL). At this point, only 1 group (HOOT HOWL) is formed.

The process is continued forward from MEOW. Eventually, when the last list entry is processed, the text grouping as shown in table 7 is formed for logical leaf page construction.

TABLE 7

| Logical Page Address | Key |
|---|---|
| p1 | BAA BARK |
| p2 | HEEP HIRP |
| p3 | HOOT HOWL |
| p4 | MEOW MOO |
| p5 | PEEP PLOP |
| p6 | QUACK ROAR |
| p7 | EAK EAL |
| p8 | TWEET TWITTER |

Key list 114 as shown in table 8 has been formed for prior level processing where the text groupings formed for logical pages are represented with addresses from p1–p8. Any stripped common text that is associated with a logical page is shown as a prefix separated by a dash from the page pointer in table 8.

TABLE 8

| TOD | Key |
|---|---|
| 0 | ARF |
| 6 | p1 |
| 7 | C-p2 |
| 11 | CRY |
| 5 | GROWL |
| 4 | p3 |
| 3 | p4 |
| 6 | p5 |
| 4 | p6 |
| 2 | SQUAWK |
| 29 | SQU-p7 |
| 7 | p8 |
| 5 | WHINNEY |

For this limb level processing, the first TOD decline from 11 to 5 between CRY and GROWL indicates that p2 and CRY can be grouped to form a starting partition with a resulting TOD of 7. The contents of key list 114 becomes as shown in table 9.

TABLE 9

| TOD | Key |
|---|---|
| 0 | ARF |
| 6 | p1 |
| 7 | (C-p2 CRY) |
| 5 | GROWL |
| 4 | p3 |

Next, the TOD decline from 7 to 5 between (C-p2 CRY) and GROWL indicates that p1 and (C-p2 CRY) can be grouped with a resulting TOD of 6. The contents of key list 114 becomes as shown in table 10.

TABLE 10

| TOD | Key |
|---|---|
| 0 | ARF |
| 6 | (p1 C-p2 CRY) |
| 5 | GROWL |
| 4 | p3 |

Then, the TOD decline from 6 to 5 between (p1 C-p2 CRY) and GROWL indicates that ARF and (p1 C-p2 CRY) can be grouped with a resulting TOD of 0. The contents of key list 114 becomes as shown in table 11.

TABLE 11

| TOD | Key |
|---|---|
| 0 | (ARF p1 C-p2 CRY) |
| 5 | GROWL |
| 4 | p3 |
| 3 | p4 |

Then, the TOD decline from 5 to 4 between GROWL and p3 indicates that (ARF p1 C-p2 CRY) and GROWL can be grouped with a resulting TOD of 0. The contents of key list 114 becomes as shown in table 12:

TABLE 12

| TOD | Key |
|---|---|
| 0 | (ARF p1 C-p2 CRY GROWL) |
| 4 | p3 |
| 3 | p4 |

The TOD decline from 4 to 3 between p3 and p4 indicates that (ARF p1 C-p2 CRY) and GROWL can be grouped with a resulting TOD of 0. The contents of key list 114 becomes as shown in table 13.

TABLE 13

| TOD | Key |
|---|---|
| 0 | (ARF p1 C-p2 CRY GROWL p3) |
| 3 | p4 |
| 6 | p5 |
| 4 | p6 |
| 2 | SQUAWK |

Then, the TOD decline from 6 to 4 between p5 and p6 indicates that p4 and p5 can be grouped with a resulting TOD of 3. The contents of key list 114 becomes as shown in table 14.

TABLE 14

| TOD | Key |
| --- | --- |
| 0 | (ARF p1 C-p2 CRY GROWL p3) |
| 3 | (p4 p5) |
| 4 | p6 |
| 2 | SQUAWK |

The TOD decline from 4 to 2 between p6 and SQUAWK indicates that (p4 p5) and p6 can be grouped with a resulting TOD of 3. The contents of key list 114 becomes as shown in table 15.

TABLE 15

| TOD | Key |
| --- | --- |
| 0 | (ARF p1 C-p2 CRY GROWL p3) |
| 3 | (p4 p5 p6) |
| 2 | SQUAWK |
| ... | |

The TOD decline from 3 to 2 between (p4 p5 p6) and SQUAWK indicates that (ARF p1 C-p2 CRY GROWL p3) and (p4 p5 p6) can be grouped. However, in this example, this acquisition can't be done due to page size. At this point, 2 groups are formed and sent to the page construction server queue. The process is continued forward from SQUAWK.

Eventually, the groups as shown in table 16 would be formed for limb page level construction.

TABLE 16

ARF p1 C-p2 CRY GROWL p3
p4 p5 p6
SQUAWK SQU-p7 p8 WHINNEY

The list as shown in table 17 would be created for the final trunk page level processing where the above groupings are represented with logical page addresses from p9–p11.

TABLE 17

| 0 | p9 |
| --- | --- |
| 3 | p10 |
| 2 | p11 |

Figure 4A:
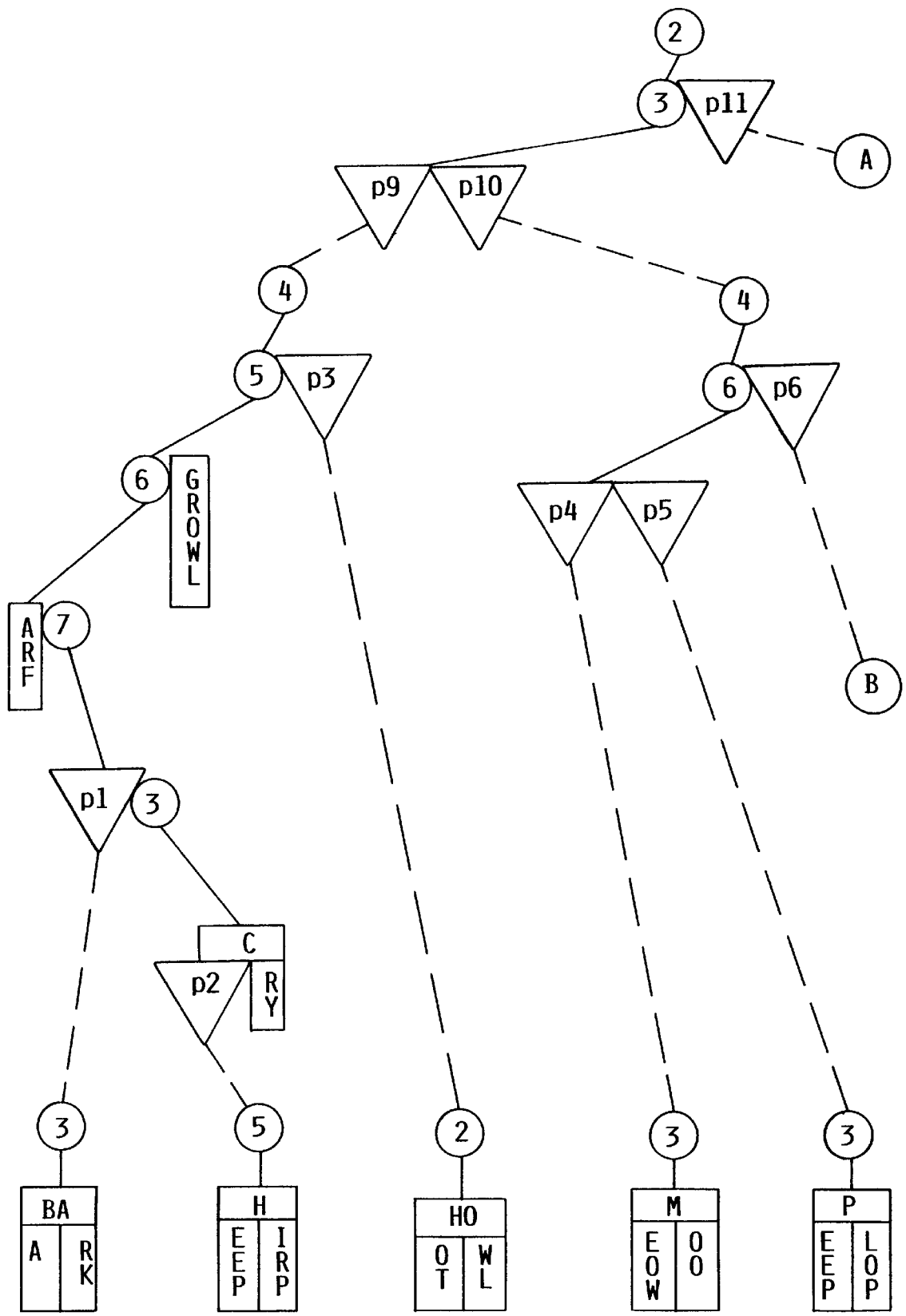
FIG. 4 shows the resulting partitioned binary radix tree data structure, according to the preferred embodiment.
Figure 4B:
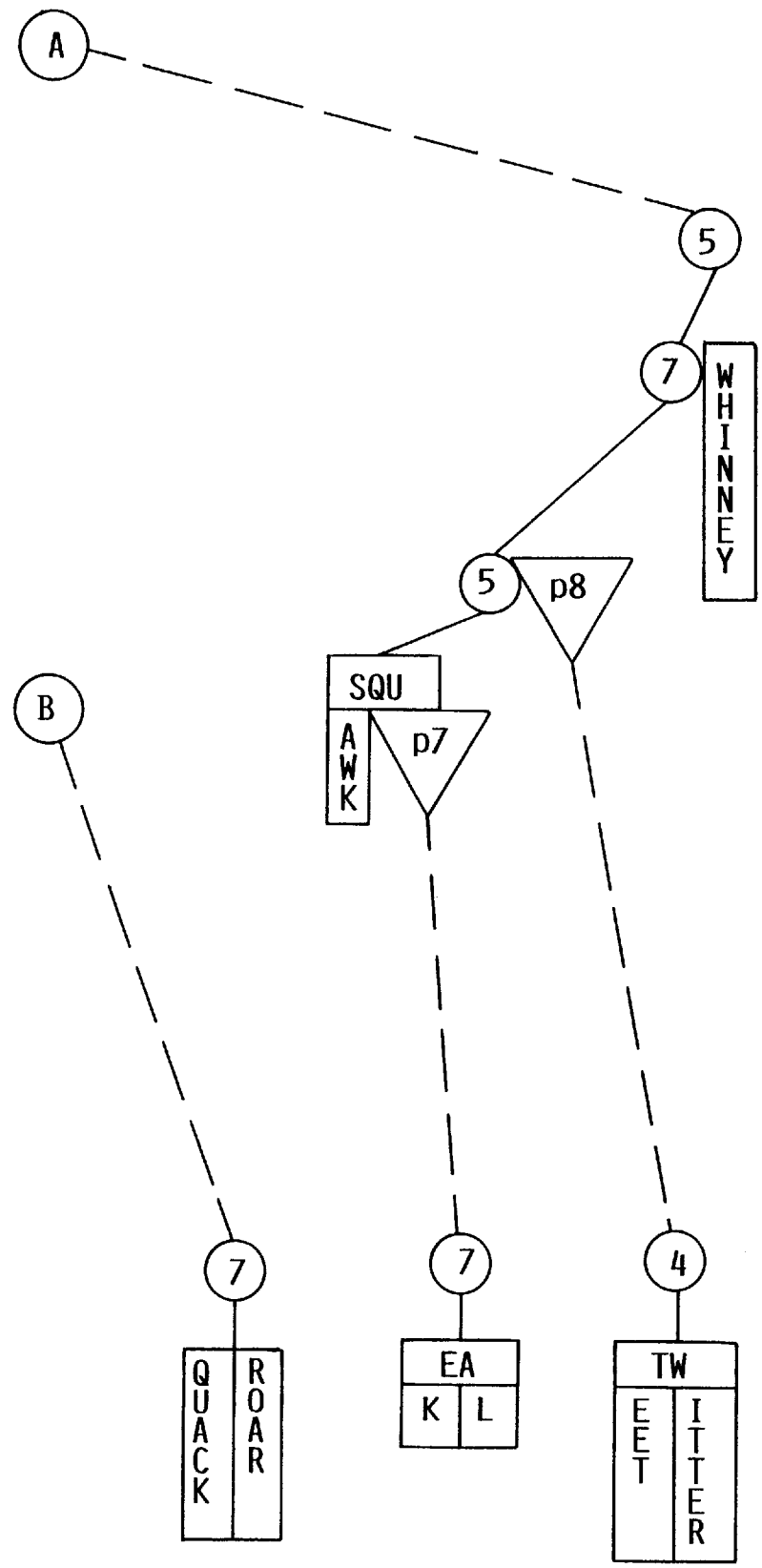

FIG. 4 shows the resulting tree after this build. The dashed lines depict pointer connections between tree partitions.

Figure 5A:
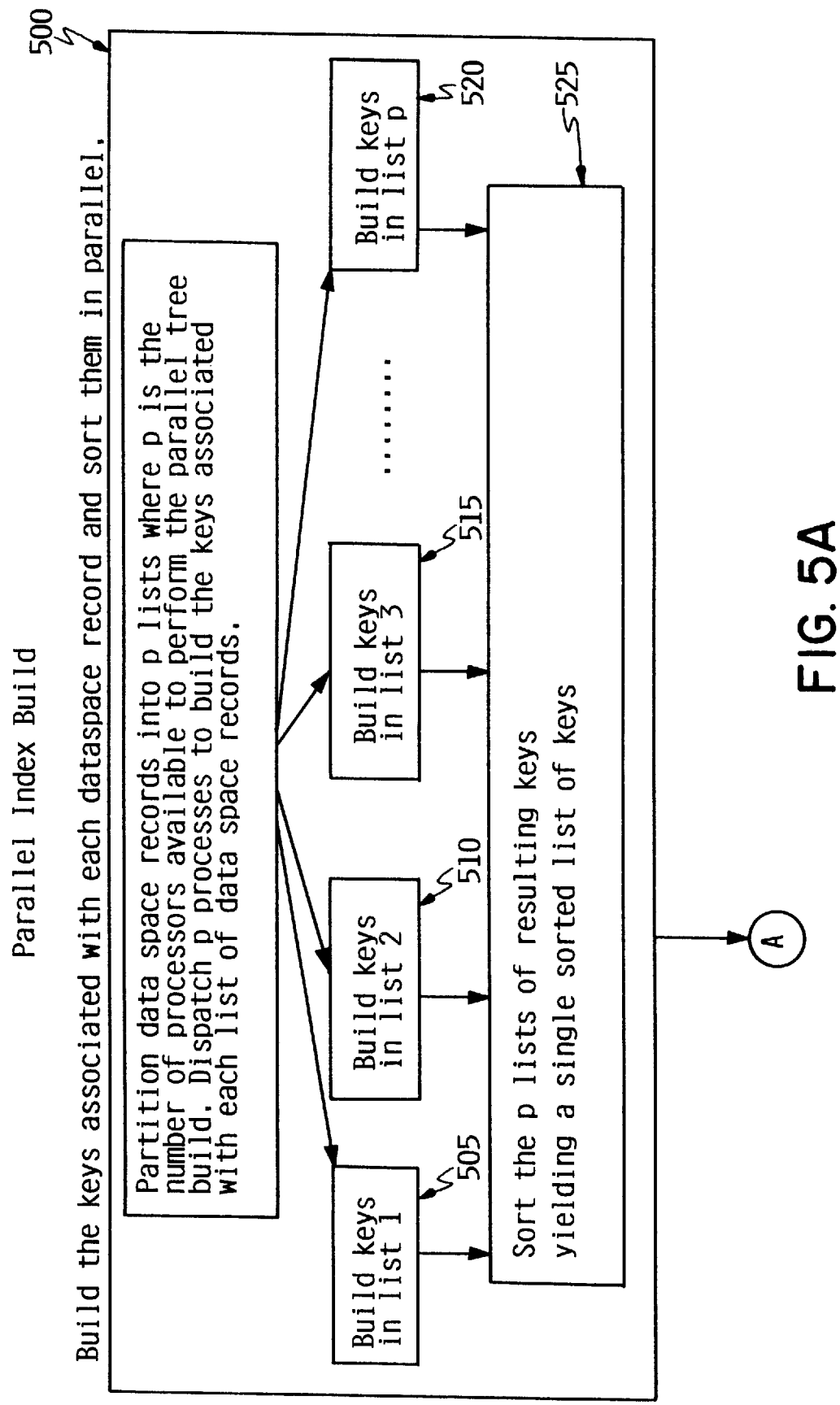
FIGS. 5 and 6 are flow charts that describe the operation of the control program as it does a parallel index build, according to the preferred embodiment.
Figure 5B:
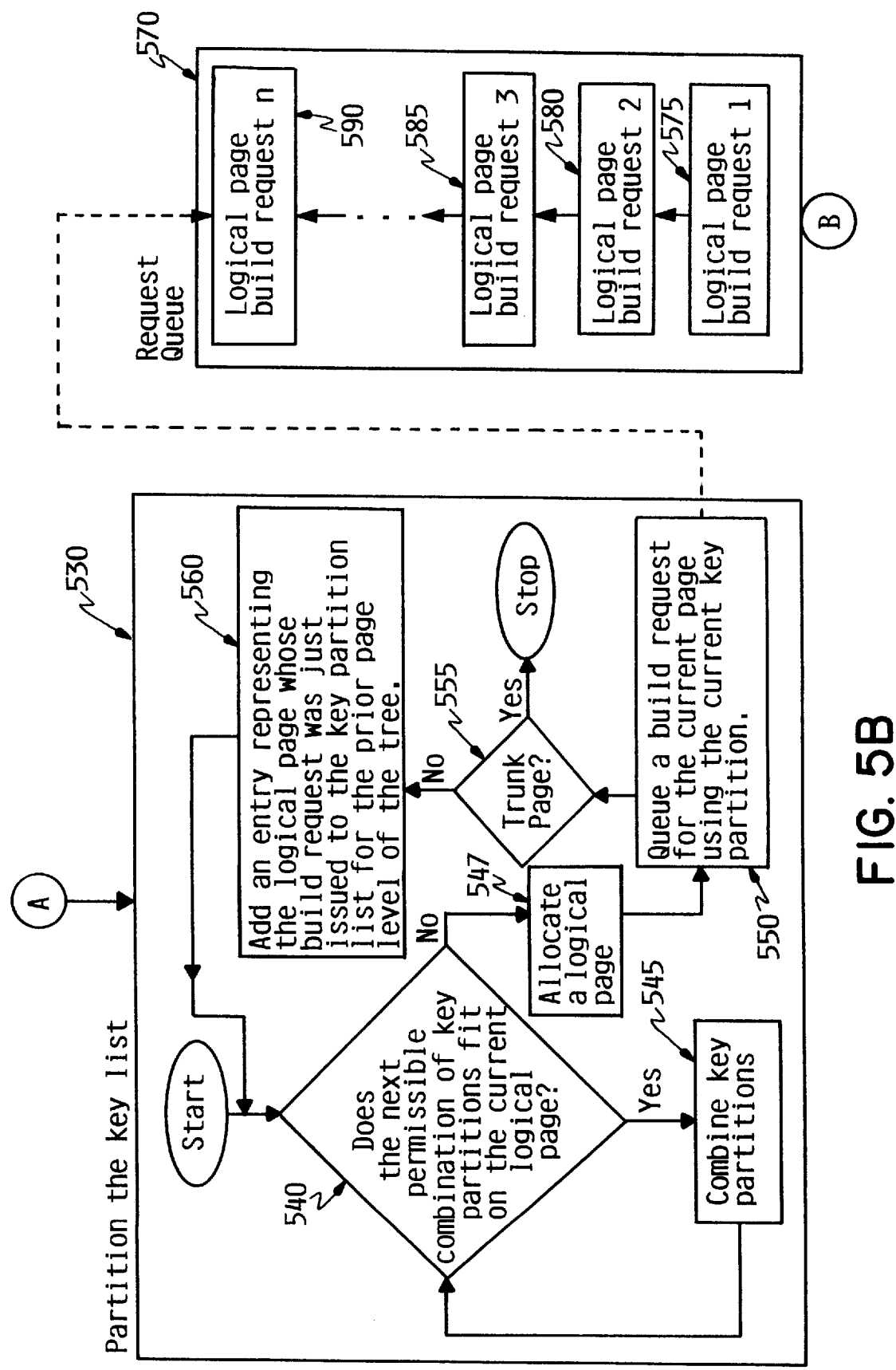
Figure 5C:
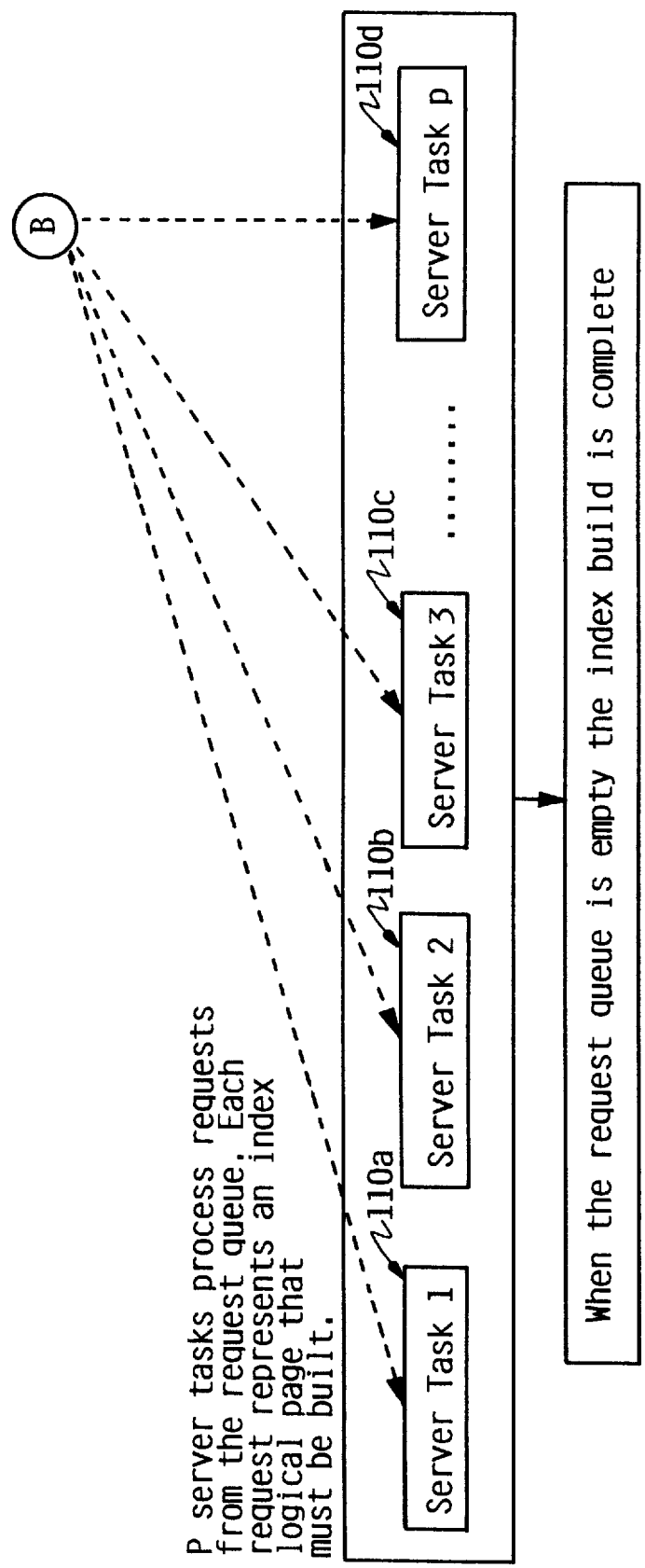

FIG. 5 is a flow chart that depicts the operation of the control program as it does a parallel index build, according to the preferred embodiment.

At block 500, client task 108 partitions the data space records of radix tree 112 into p lists where p is the number of processors 102 available to perform the parallel tree build and dispatches p server tasks 110 to build the keys associated with each list of data space records. At blocks 505, 510, 515, through block 520 server tasks 110 build the key lists. At block 525, client task 108 sorts the p lists of resulting keys resulting in single, sorted key list 114. An example of the processing depicted by block 525 is taught in U.S. Pat. No. 5,179,699, which is hereby incorporated by reference.

At block 530, the client task 108 partitions the key list, as further described in the following details. At block 540, client task 108 checks whether the next permissible combination of key partitions fit on the current logical page. If true, client task 108 combines the key partitions at block 545 and continues back to block 540. When next permissible combination no longer fits on the current logical page, client task 108 continues to block 547 where it allocates a logical page from radix tree 112. Then, at block 550, client task 108 builds a logical page request 575 for the current page using the current key partition and sends the request to request queue 570. At block 555, client task 108 checks whether the current logical page is the trunk page of the tree. If the current page is the trunk page, then client task 108 has completed its portion of the tree build. If the trunk page has not yet been reached, at block 560, client task 108 adds an entry representing the logical page whose build request was just issued (in block 550) to key list 114 for the prior page level of the tree. Client task 108 then continues to block 540 to process the next logical page. In this way, client task 108 continues to issue logical page build request 580, 585, through logical page build request 590 to request queue 570, which will be processed by server tasks 110a, 110b, 110c, through 110d, as further described under the description for FIG. 6.

Figure 6A:
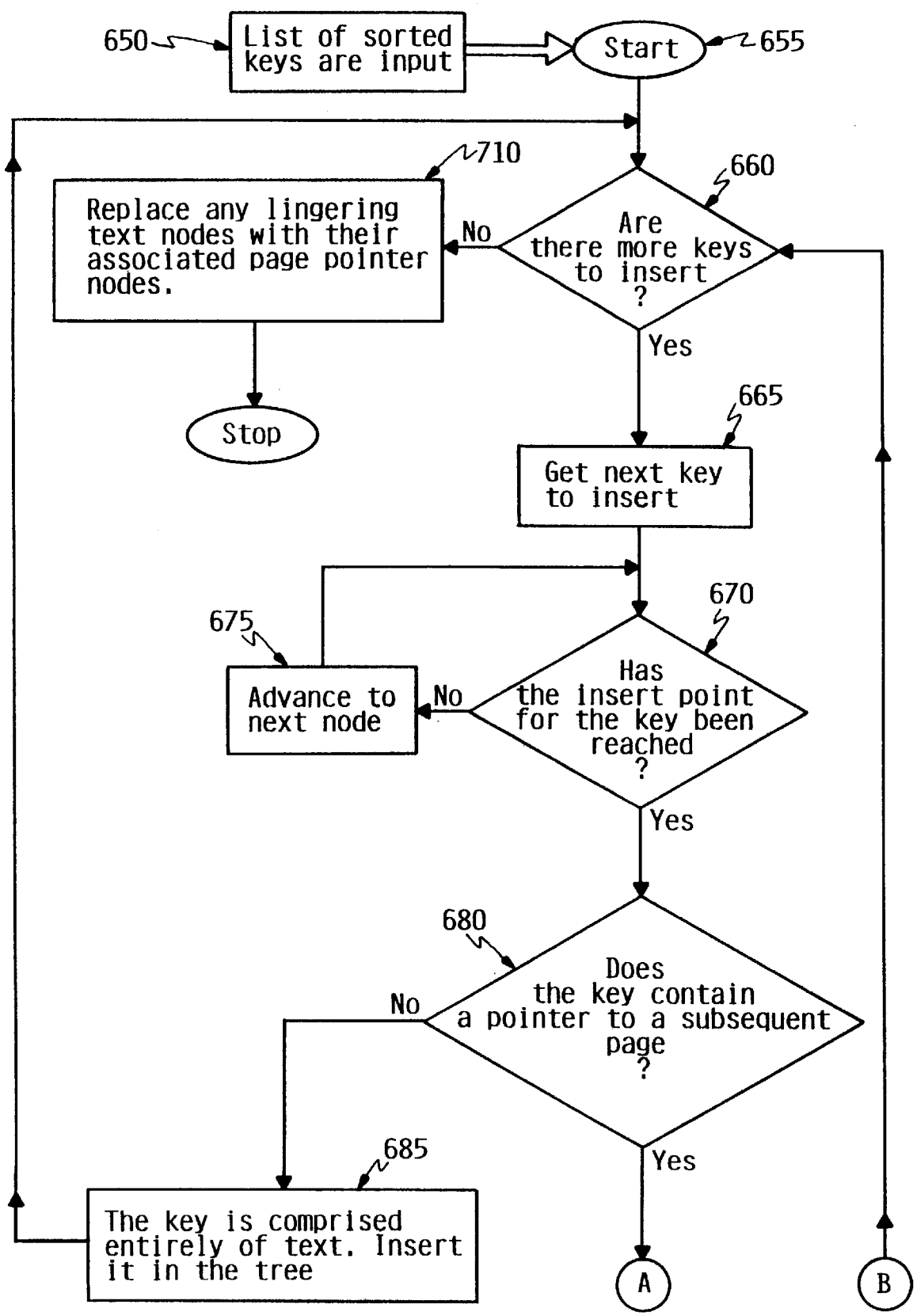
Figure 6B:
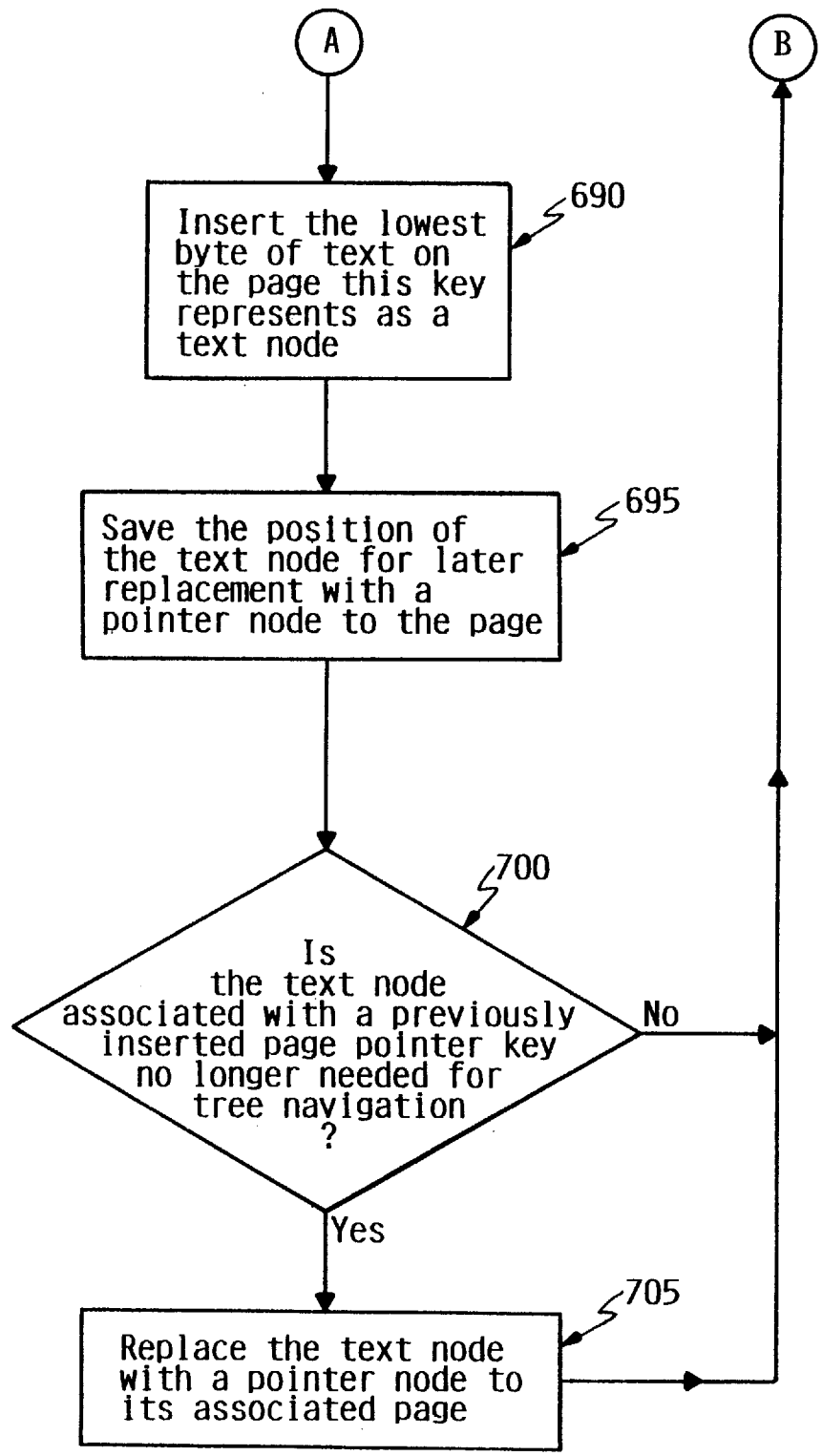

FIG. 6 is a flow chart that depicts the operation of server tasks 110 as they perform a top down logical page index construction. At block 655, server task 110 accepts as input the list of sorted keys on a logical page 650, which is part of one of the logical page build requests 575, 580, 585, through 590. At block 660, server task 110 checks whether there are more keys to insert in tree 112. If there are more keys to insert, at block 665 server task 110 gets the next key to insert. At block 670, server task 110 checks whether the node that is the insert point for the key has been reached within tree 112. If not, at block 675, server task 110 advances to the next node. Server task 110 continues checking for the correct insert point and advancing through the nodes until the insert point is reached, at which time server task 110 continues to block 680. At block 680, server task 110 checks whether the key contains a pointer to a subsequent page in tree 112. If the key does not contain a pointer to a subsequent page, then the key is comprised of entirely text, so server task 110 inserts the key in tree 112 at block 685 and continues back to block 660. If the key does contain a pointer to a subsequent page, then server task 110 inserts the lowest byte of text on the page that this key represents as a text node at block 690. At block 695, server task 110 saves the position of the text node for later replacement with a pointer node to the page. At block 700, server task 110 checks whether the text node associated with a previously inserted page pointer key is no longer needed for tree navigation. If true, server task 110 replaces the text node with a pointer node to its associated page at block 705 and continues back to block 660. If false, server task 110 continues directly to block 660.

When, at block 660, there are no more keys to insert in tree 112, server task 110 replaces any lingering text nodes with their associated page pointer nodes at block 710 and exits.

Figure 7:
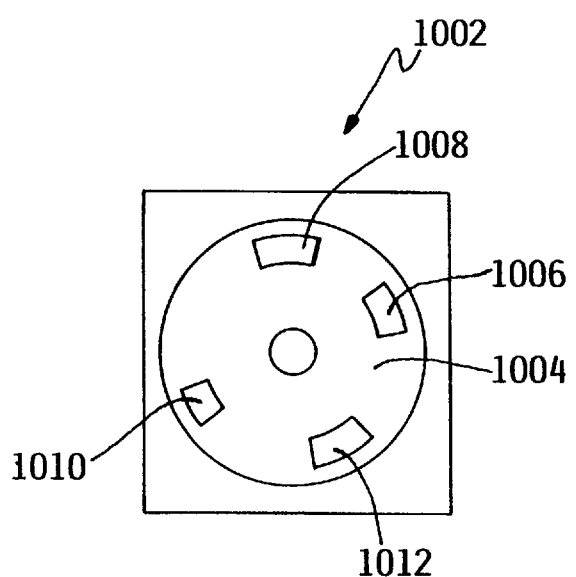
FIG. 7 is block diagram of an article of manufacture or a computer program product including a storage medium for storing thereon program means for carrying out the control program, according to the preferred embodiment.

FIG. 7 shows an article of manufacture or a computer program product including a storage medium for storing thereon program means for carrying out the method of this invention in the system of FIG. 1. It is important to note that while the present invention has been described in the context of a computer system, that those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks and CD ROMs and transmission type media such as digital and analog communications links.

An example of such an article of manufacture is illustrated in FIG. 11 as pre-record floppy disk 1002. Floppy disk 1002 is intended for use with a data processing system, and includes magnetic storage medium 1004, and program means 1006, 1008, 1010, and 1012 recorded thereon, for directing control program 110 to facilitate the practice of this invention. It will be understood that such apparatus and articles of manufacture also fall within the spirit and scope of this invention.

While this invention has been described with respect to the preferred and alternative embodiments, it will be understood by those skilled in the art that various changes in detail may be made therein without departing from the spirit, scope, and teaching of the invention. For example, although the examples have shown a binary radix tree, the tree could be other types of trees such as an M-ary tree with corresponding changes to the key partition algorithm. A M-ary tree is a tree where a parent node has a maximum of M children. Accordingly, the herein disclosed invention is to be limited only as specified in the claims below.

The following is an example of pseudo-code implementation for control program 107.

```
-- Main --
/* Process the key list from start to end. Group keys into partitions. */
/* For each partition, send off a request for logical leaf page
construction. */
/* Also, build another list for next prior limb level processing. */
Call build_a_level;
Do while not reaching trunk level
    /* Now a new list for prior limb level has already been created. */
    /* Process the list from start to end. Group entries into partitions. */
    /* For each partition, allocate a page and send off a request to build
    a limb page.*/
    /* Build another list for prior level processing. */
    Call build_a_level;
End;              /* end do while     */
/* Wait for all logical page construction requests to be completed. */
end;              /* main             */
-- procedure build_a_level
build_a_level:proc;
/* Initialization */
last_point := 1;
n :=1;
/* Rolling forward to find a proper split point so that preceding
consecutive keys could be combined to form a group */
Do while (n <= #_of_keys_in_list)
    If /* there is an increase in the score between consecutive keys or this
    is the first processing entry */ (score{n} < score{n+1 }) (n =
    last_point)
    then
        ;/* No decision can be made. Keep on rolling forward */
    else /* Since this is the greatest score from the last starting point, this
    is the proper split point for a group's upper bound. It's proper to
    combine Nth key with its preceding entity. However, that can be done
    only if the new group could be fitted onto a logical page. */
        If (key n and preceding entity would not fit on a logical.page) /* This
        implies that preceding entity is a group since at least 2 entries must
        be
        fitted on a given logical page. Also, this is a proper spot for a new
        starting point. */
        then
            Send off current group(s) for processing;
            /* There could be more than one groups pending for
            expansion. */
            For each group formed, create and add an entry to the new list;
            Copy any entry not selected (from the last starting point) to
            the new list for next level processing;
            /* Remember that all entries up to this point have been
            processed */
            last_point := n + 1;
        else /* key n and the preceding entity could be fitted onto a logical
        page */
            Group Nth key with its preceding entity;
            Mark the Nth key and its preceding entity to indicate that they
            are already selected/acquired into a partition;
            Update left_bound accordingly if preceding entity is a key;
            /* Now we need to expand this new group by acquiring either its
            preceding entity or succeeding key. The adjacent entity with a
            higher score will be the candidate for acquisition */
            spin_back := on;
            Roll backward up to the last processing point to find the proper
            split point;
            Set left_bound to the entry preceding the first entry of current
            group;
            Do while not passing last processing point and page is not full
            and backward score is > forward score
                (left_bound > last_point) until (spin_back=off);
                If TOD between first entry of the group and its preceding
                entity is higher than TOD between last entry of the group
                and its succeeding entity (score{left_bound+1} >
                score{n+1}) then
                    /* this is not a split point */
                    /* It's proper to combine the preceding entity into the
                    group. However, that could be done only if the new
                    group could be fiffed onto a logical page. */
                    If preceding entity and current group could be fitted
                    onto a logical page then
                        Group preceding entity with current group;
                        If necessary, mark entries to indicate that they are
                        already selected/acquired into a partition;
                        Update left_bound (index to previous entry) to
                        continue rolling backward;
                        If preceding entity is a group then
                            Skip other entries (if any) already
                            acquired to this group and directly get to
                            the entry prior to the first entry of the
                            current group;
                        else
                            Roll back one more entry left_bound :=
                            left_bound - 1;
                    else /* preceding entity and current group would not fit
                    onto a logical page. It implies this is a valid split point
                    */
                        Send off current group(s) for processing;
                        For each group formed, create and add an entry
                        to the new list;
                        Copy entries not selected to the new list;
                        /* Remember this is the last processing point so
                        that is point will not be passed when rolling
                        backward later */
                        last_point := n +1;
                        /* Stop rolling backward
                        spin_back := off;
                else
                    /* Stop rolling backward. */
                    spin_back := off;
            end;                /* rolling backward */
            /* Continue rolling forward
            n := n + 1;
    End;                /* rolling forward */
n := n - 1;
/*    Process any remaining entries and group. */
/* For each group formed, create and add an entry to the new list. */
/* Copy entries not selected to the new list. */
end;                /* procedure build_a_level */
```

What is claimed is:

1. A method for building a radix tree, comprising the computer executed steps of:

allocating pages in said radix tree, wherein said pages are organized into levels from a leaf level at the bottom of said radix tree to a trunk level at the top of said radix tree;

partitioning keys into said pages at each level of said radix tree starting at said leaf level of said radix tree and progressing to said trunk level of said radix tree, wherein all subtrees of keys on a first page have a common parent on said first page; and building each page by inserting said keys into said page starting at the top of said page and progressing to the bottom of said page.

2. The method of claim 1, wherein said partitioning step further comprises:

assigning a text of difference s core (TOD) score to each key entry;

scanning said keys searching for a decline in said TOD score between successive keys; and partitioning said keys into said groups of pages based on said decline in said TOD score.

3. The method of claim 1, wherein each page in said building step is built in parallel on multiple processors.

4. An apparatus for building a radix tree, comprising:

means for allocating pages in said radix tree, wherein said pages are organized into levels from a leaf level at the bottom of said radix tree to a trunk level at the top of said radix tree;

means for partitioning keys into said pages at each level of said radix tree starting at said leaf level of said radix tree and progressing to said trunk level of said radix tree, wherein all subtrees of keys on a first page have a common parent on said first page; and means for building each page by inserting said keys into said page starting at the top of said page and progressing to the bottom of said page.

5. The apparatus of claim 4, where in said partitioning means further comprises:

means for assigning a text of difference score (TOD) score to each key entry;

means for scanning said keys searching for a decline in said TOD score between successive keys; and means for partitioning said keys into said groups of pages based on said decline in said TOD score.

6. The apparatus of claim 4, wherein each page in said building means is built in parallel on multiple processors.

7. A program product for building a radix tree, comprising:

means for allocating pages in said radix tree, wherein said pages are organized into levels from a leaf level at the bottom of said radix tree to a trunk level at the top of said radix tree;

means for partitioning keys into said pages at each level of said radix tree starting at said leaf level of said radix tree and progressing to said trunk level of said radix tree, and wherein all subtrees of keys on a first page have a common parent on said first page;

means for building each page by inserting keys into said page starting at the top of said page and progressing to the bottom of said page;

signal-bearing media bearing said allocating means, said partitioning means, and said building means.

8. The program product of claim 7, wherein said partitioning means further comprises:

means for assigning a text of difference score (TOD) score to each key entry;

means for scanning said keys searching for a decline in said TOD score between said successive keys; and means for partitioning said keys into groups of pages based on said decline in said TOD score.

9. The program product of claim 7, wherein each page in said building means is built in parallel on multiple processors.

* * * * *